United States Patent
Hodgson et al.

(10) Patent No.: US 9,816,418 B2
(45) Date of Patent: Nov. 14, 2017

(54) METHOD FOR OPERATING A DEVICE FOR CONVEYING A FLUID

(71) Applicant: CONTINENTAL AUTOMOTIVE GMBH, Hannover (DE)

(72) Inventors: Jan Hodgson, Troisdorf (DE); Christian Vorsmann, Köln (DE); Rolf Brück, Bergisch Gladbach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/895,775

(22) PCT Filed: May 9, 2014

(86) PCT No.: PCT/EP2014/059516
§ 371 (c)(1),
(2) Date: Dec. 3, 2015

(87) PCT Pub. No.: WO2014/195082
PCT Pub. Date: Dec. 11, 2014

(65) Prior Publication Data
US 2016/0131004 A1 May 12, 2016

(30) Foreign Application Priority Data

Jun. 4, 2013 (DE) .................. 10 2013 105 710

(51) Int. Cl.
*F01N 3/20* (2006.01)
(52) U.S. Cl.
CPC ........... *F01N 3/208* (2013.01); *F01N 3/2066* (2013.01); *F01N 2560/08* (2013.01);
(Continued)

(58) Field of Classification Search
CPC ...... F01N 3/029; F01N 3/0842; F01N 3/2066; F01N 3/208
See application file for complete search history.

(56) References Cited

U.S. PATENT DOCUMENTS

2007/0283685 A1* 12/2007 Ripper ................... B01D 53/90
60/288
2010/0307142 A1* 12/2010 Habumuremyi ........ F01N 3/208
60/295
(Continued)

FOREIGN PATENT DOCUMENTS

DE  10 2004 030 441  1/2006
DE  10 2004 054 238  5/2006
(Continued)

*Primary Examiner* — Patrick Maines
(74) *Attorney, Agent, or Firm* — Cozen O'Connor

(57) ABSTRACT

A method for operating a device that conveys a fluid includes: A) detecting activation of the device; B) filling a conveying line with the fluid by operating at least one pump in a conveying direction from at least one tank to at least one injector, and detecting complete filling of the conveying line based on at least one sudden pressure increase at at least one pressure sensor; C) operating the pump and making available fluid at the injector; D) detecting deactivation of the device; and E) partially emptying the conveying line by sucking back the fluid by operation of the at least one pump in a direction counter to the conveying direction. The emptying is stopped if pressure measured at the at least one pressure sensor corresponds to an ambient pressure.

14 Claims, 2 Drawing Sheets

(52) U.S. Cl.
CPC .... *F01N 2610/02* (2013.01); *F01N 2610/144* (2013.01); *F01N 2610/1486* (2013.01); *F01N 2610/1493* (2013.01); *F01N 2900/1808* (2013.01); *Y02T 10/24* (2013.01)

(56) References Cited

U.S. PATENT DOCUMENTS

| | | | | |
|---|---|---|---|---|
| 2010/0319651 A1* | 12/2010 | Kasahara | ............ | F01N 3/2066 123/198 R |
| 2011/0099983 A1* | 5/2011 | Ohno | ............ | F01N 3/2066 60/277 |
| 2012/0047880 A1* | 3/2012 | Leonard | ............ | F01N 3/208 60/295 |
| 2013/0186073 A1* | 7/2013 | Onodera | ............ | F01N 3/208 60/277 |
| 2015/0308317 A1* | 10/2015 | Ohno | ............ | B01D 53/90 60/274 |

FOREIGN PATENT DOCUMENTS

| | | |
|---|---|---|
| DE | 10 2007 00053 A1 | 5/2008 |
| DE | 10 2007 005 005 | 8/2008 |
| DE | 10 2007 035 983 | 2/2009 |
| DE | 10 2010 016 654 | 11/2010 |
| DE | 10 2011 076 429 | 11/2012 |
| DE | 10 2011 118 626 | 5/2013 |
| JP | 2011-117440 | 6/2011 |
| JP | 2012-127214 | 7/2012 |
| JP | 2012127214 A * | 7/2012 |

* cited by examiner

METHOD FOR OPERATING A DEVICE FOR CONVEYING A FLUID

CROSS-REFERENCE TO RELATED APPLICATIONS

This is a U.S. national stage of application No. PCT/EP2014/059516, filed on 9 May 2014, which claims priority to the German Application No. DE 10 2013 105 710.1 filed 4 Jun. 2013, the content of both incorporated herein by reference.

BACKGROUND OF THE INVENTION

1. Field of the Invention

The invention relates to a method for operating a device for conveying a fluid. The device can be used, for example, in a motor vehicle in order to convey a liquid additive to an exhaust gas treatment device for purifying the exhaust gases of an internal combustion engine of the motor vehicle, and to feed the liquid additive to the exhaust gas treatment device.

2. Related Art

In exhaust gas treatment devices to which a liquid additive for purifying exhaust gases is fed it is possible, for example, for the method of selective catalytic reduction (SCR method) to be carried out. In this method nitrogen oxide compounds in the exhaust gas of an internal combustion engine are reduced using a reducing agent. The reducing agent that is used is usually ammonia. In motor vehicles, ammonia is usually not stored directly but rather in the form of a reducing agent precursor solution. A frequently used reducing agent precursor solution is liquid urea-water solution. A 32.5 percent urea-water solution can be obtained under the trade name AdBlue®. This reducing agent precursor solution can be fed to an exhaust gas treatment device with a device that can be operated according to the method described below.

During the development, during the manufacture and during the operation of devices for making available liquid additive for purifying exhaust gas, it is generally necessary to take into account the fact that the (aqueous) fluid can freeze at low temperatures. The 32.5 percent urea-water solution freezes, for example, at −11° C. Such low temperatures can occur in the field of motor vehicles, in particular, during relatively long deactivated times in winter. When the fluid freezes, an expansion of volume typically occurs. This expansion of volume can damage the conveying device.

For this reason it is known to empty a device for conveying a fluid when operations stop. When emptying, the fluid is removed from the device and is replaced by air from the surroundings. Typically, air is sucked into the device via an injector on an exhaust gas line, while at the same time the fluid is conveyed back into a tank. Then, during the stationary phase of the motor vehicle there is no fluid present within the device. Correspondingly, no expansion of the volume of the fluid can also occur within the device. It is also not possible for a volume of fluid within the device to expand within the device. However, it is problematic here that an emptied device first has to be filled before it can be re-activated. When the device is refilled, there is, in particular, the risk of leakage occurring. If the device is connected to an exhaust gas treatment device, it is possible for fluid to spill over into the exhaust gas treatment device when refilling is carried out, for example. Furthermore, both when emptying and when filling the device unnecessarily long operation of the pump of the device should be avoided. A short operating period of the pump reduces, on the one hand, the energy consumption during the filling and during the emptying. On the other hand, it is therefore also possible to avoid a situation in which the pump is damaged and/or increased wear of the pump occurs as a result of undesired conveyance of air and/or as a result of the pump working against an increased conveying resistance.

SUMMARY OF THE INVENTION

An object of the present invention is to solve or at least alleviate the described technical problems of the prior art. The intention is, in particular, to present a particularly advantageous method for operating a device for conveying a fluid, in which method the device is filled when it is activated and emptied when it is deactivated.

This object is achieved, in one aspect, with a method according to the features of the claims, which features can be combined with one another in any desired technically appropriate way, and can be supplemented with more detail from the description and, in particular, from the description of the figures.

In one aspect, the invention relates to a method for operating a device for conveying a fluid with a conveying line that can be divided into a suction line section from at least one tank to at least one pump and into a pressure line section from the pump to at least one injector and with at least one pressure sensor on the pressure line section, wherein the method comprises at least the following steps:

A) detecting activation of the device;
B) filling the conveying line with the fluid by operating the at least one pump with a conveying direction from the at least one tank to the at least one injector, and detecting complete filling of the conveying line on the basis of at least one sudden pressure increase at the at least one pressure sensor;
C) operating the pump and making available fluid at the injector;
D) detecting deactivation of the device; and
E) partially emptying the conveying line by sucking back the fluid with operation of the at least one pump counter to the conveying direction, wherein the emptying is stopped if the pressure measured at the at least one pressure sensor corresponds to an ambient pressure.

The conveying line of the device is preferably not branched. This means, in particular, that the device does not have a return line which branches off from the pressure line section of the conveying line and leads back into the tank. However, it is nevertheless to be possible for the conveying line to have a plurality of lines that run parallel (to one or more injector(s)). It is possible, for example, for two pumps that are connected in parallel to be present in the conveying line, which pumps can convey in parallel with one another, in order to convey the fluid in a conveying direction along the conveying line. In addition, it is possible for a plurality of injectors to be provided via which it is possible to feed fluid in parallel to an exhaust gas treatment device. However, there is preferably no possibility provided of using the pump to carry out circular conveying from the tank through the at least one pump and back into the tank. To empty the conveying line there is preferably a need for conveying counter to the conveying direction.

The at least one pump is a pump with a reversible conveying direction. A pump with a reversible conveying direction can be, for example, an orbital pump or a hose pump. These pumps have a rotational drive that shifts a conveying volume along the conveying path in that at least one seal of the conveying line is shifted along the conveying line. This is done in a hose pump by, for example, an excentric shifting a compressed region of a hose in the conveying direction, wherein the at least one seal is formed by the compressed region of the hose. In the case of an orbital pump, this is done by at least one seal of a conveying line, which is formed by least one seal, formed by a deformable diaphragm, of a conveying line being shifted in the conveying direction. With such a pump, it is possible to reverse the conveying direction by reversing the driving direction. The at least one seal is then respectively shifted in the opposite direction.

However, the pump can also be a pump whose conveying direction can be reversed using a valve arrangement. If a valve arrangement is provided for reversing the conveying direction at the pump, the pump can be a reciprocating piston pump or a diaphragm pump which has a pump chamber volume that becomes larger and smaller for the conveying process. This pump can also be constructed as a system composed of a plurality of pump chamber units, wherein at least one pump chamber unit serves to convey in the conveying direction, while at least one further pump chamber unit serves to convey counter to the conveying direction.

The pressure sensor is preferably embodied such that it can measure a pressure of the fluid in the pressure line section. In one embodiment variant of the pressure sensor, a measuring cell of the pressure sensor is directly connected to the conveying line (directly/indirectly), with the result that the pressure of the fluid is transmitted to the measuring cell.

The described device for conveying fluid is suitable, in particular, for conveying a liquid additive (such as a urea-water solution) for purifying exhaust gas in the exhaust gas treatment device of an internal combustion engine.

The metering of the fluid using the device is preferably carried out by the at least one injector connected to the pressure line section. The pressure line section is preferably connected to a pressure accumulator and/or itself forms the pressure accumulator. The pump conveys the fluid into the pressure line section. The pressure in the pressure line section is monitored using the pressure sensor. The pump is operated using the information about the pressure in the pressure line section, made available via the pressure sensor, in such a way that the pressure in the pressure line section is constant. The quantity of fluid output by the injector is then proportional to the opening time of the injector. The metering can therefore take place by adapting the opening time of the injector.

In the method in step A), first the activation of the device is detected. This can be done, for example, by detecting a starting of a motor vehicle with the device or a starting of an internal combustion engine of the motor vehicle. If the activation of the device is detected in step A), the conveying line of the device is typically emptied because the conveying line was emptied during the last operational stop or the last deactivation of the device. Accordingly, after step A), the conveying line is filled with the fluid in a step B). This is done, in particular, in that the at least one pump conveys the fluid from the tank, and in the process sucking or forcing the fluid into the conveying line and, in particular, into the suction line section of the conveying line. In this context, air in the conveying line is pushed out of the conveying line. In the process, the air preferably leaves the conveying line via the injector. If the pressure line section of the conveying line is completely filled and the fluid reaches the at least one injector, a sudden pressure increase occurs in the pressure line section. The sudden pressure increase means here, in particular, that the pressure rises abruptly or that a very high pressure gradient is present. This sudden pressure increase can be detected with the at least one pressure sensor. The sudden pressure increase occurs because the flow resistance is significantly increased when the fluid reaches the injector. This occurs, for example, owing to the fact that the cross section of the injector through which the fluid can freely flow is substantially smaller than the cross section of the conveying line through which the fluid can freely flow. The through-flow resistance of the injector is significantly lower for air than for the fluid.

In step C), usual operation of the device occurs in which the pump is operated in order to convey the fluid, meter it and/or make it available (in the pressure line section).

In step D), deactivation of the device is detected. Deactivation of the device can be detected, for example, if a motor vehicle with the device or deactivation of an internal combustion engine is detected.

Then, step E) is initiated in which partial emptying of the conveying line takes place by sucking back the fluid. The sucking back is carried out until a pressure that corresponds to the ambient pressure is measured at the at least one pressure sensor. The ambient pressure is, in particular, the atmospheric pressure of the air in the surroundings of the device. This pressure is usually also present in an exhaust gas treatment device if the motor vehicle is deactivated. If an injector of the device is connected to an exhaust gas treatment device, the ambient pressure can also be transmitted into the conveying line of the device through the injector. If the measured pressure at the injector corresponds to the ambient pressure, there is a connection, filled with air, between the surroundings and the pressure sensor. It is therefore possible to detect that partial emptying of the conveying line (as far as the pressure sensor) has taken place.

Furthermore, the method is advantageous if during step C) a constant pressure is maintained in the pressure line section of the conveying line using the at least one pump, and metered provision of fluid is achieved by an adapted opening time of the at least one injector.

The fluid is preferably discharged in a metered fashion if an external metering request is made of the device. An external metering request is made of the device, for example, when an exhaust gas treatment device requires fluid for purifying the exhaust gas. An external metering request can be generated by a control unit. During step C), the fluid in the pressure line section is at an operating pressure that is preferably between 5 and 10 bar. This described method is a particularly advantageous method with which a precise metering of fluid can be achieved using the described device for the described method.

The described method provides a particularly simple and efficient possible way of operating a device for conveying a fluid in such a way that filling is carried out in the case of activation, and (partial) emptying is carried out again in the case of deactivation, without additional components for carrying out the emptying process and the filling process being necessary.

Furthermore, the method is advantageous if step B) comprises at least the following sub-steps:

B.1) opening the at least one injector;
B.2) conveying fluid with the at least one pump;
B.3) monitoring the pressure in the conveying line using the at least one pressure sensor;
B.4) detecting a sudden pressure increase at the at least one pressure sensor; and B.5) closing the at least one injector and stopping the conveying of fluid with the at least one pump.

The sub-steps B.1 to B.5) explain in detail a preferred procedure carried out within the scope of step B), wherein this procedure is referred to below as a first embodiment variant of step B). In step B.1) the at least one injector is opened. This takes place so that the flow resistance for air that flows out of the conveying line is as low as possible. The opening of the injector takes place only if the injector is closed before step B.1). If the injector is already opened (when the device is activated), the injector can remain in the opened state. According to one preferred embodiment variant, in step B.1) it is firstly checked whether the injector is opened. If the injector is opened, it remains in the opened state. If the injector is closed, it is opened (actively). Subsequently, the fluid is conveyed in step B.2). In this context, the pressure in the conveying line is monitored using the at least one pressure sensor (see step B.3). As soon as the fluid reaches the injector, a sudden pressure increase occurs because the pump continues to convey and the flow resistance of the liquid, additive at the injector is considerably increased. This pressure increase can be detected at the pressure sensor. This takes place in step B.4). The injector is subsequently closed so that no further liquid additive exits the injector any more, and the conveying of the fluid with the at least one pump is stopped (step B.5)).

In a further embodiment variant of the described method, step B) comprises the following sub-steps:

B.i) closing the at least one injector;
B.ii) conveying fluid with the at least one pump;
B.iii) monitoring the pressure in the conveying line using the at least one pressure sensor; and
B.iv) detecting a sudden pressure increase at the at least one pressure sensor.

The embodiment variant of step B), explained in steps B.i) to B.iv) is referred to below as the second embodiment variant of step B). Therefore, two different embodiment variants of step B) are proposed. The method steps B.2) to B.4) and B.ii) to B.iv) correspond to one another in the two method variants. A difference between the two embodiment variants is provided with respect to step B.1) and B.i), respectively.

In step B.ii), the at least one injector is closed. This is done so that the flow resistance for air that exits the conveying line is in a predefined range. The closing of the injector is carried out only if the injector was opened before step B.i). If the injector is already closed (when the device is activated), the injector can remain in the closed state.

According to one preferred embodiment variant, in step B.i) it is initially checked whether the injector is closed. If the injector is closed, it remains in the closed state. If the injector is opened, it is closed (actively).

For the second embodiment variant of step B), an injector is preferably used which, in the closed state, is impermeable to the fluids to be conveyed and is permeable to air. In the open state, this injector is permeable both to the fluid and to air. However, in the closed state, the injector also has an increased (defined) flow resistance to air, with the result that a (slight) pressure increase occurs in the pressure line section if the fluid is conveyed into the conveying line and air is forced out of the conveying line through the injector. Such an injector has, in the closed state, a continuous flow path configured such that air can pass through, while the fluid (for example owing to capillary effects) cannot pass through this flow path.

This method is particularly advantageous if a continuous pressure rise (increasing over a predefined time period), occurring as a result of the filling of the conveying line, is monitored during sub-step B.3) or B.iii). The cause of the continuous pressure rise during sub-step B.3) or B.iii) is the fact that the friction of the fluid, as it flows through the conveying line, is respectively proportional to the quantity filled into the conveying line. The air can be pushed through the line with very low resistance, while relatively large flow resistance acts on the flowing fluid in the conveying line. The pressure during step B.3) therefore rises, while the conveying line continues to be filled. It is particularly advantageous to monitor this pressure rise during step B.3) because it can be detected therefrom to what extent the conveying line is already filled. This permits particularly precise control of the method. In particular, the operation of the pump can also be reduced even before the fluid actually arrives at the injector. This permits a quantity of fluid that exits the injector in step B.4), before the injector is closed in step B.5), to be kept very small.

Furthermore, the method is advantageous if the at least one pump is operated for a period of 5 seconds to 20 seconds during the sub-steps B.2) and B.3). It has become apparent that a time interval of this order of magnitude is sufficient to completely fill a conveying line of a typical length (for example between 2 m [meters] and 5 m) without an increased conveying power of the pump being necessary for this.

Furthermore, the method is particularly advantageous if a starting time is detected at which a change in the pressure begins during sub-step B.3) or B.iii) at the pressure sensor, and an end time is detected at which the sudden pressure increase occurs in sub-step B.4) or B.iv), wherein the pump is calibrated by comparison of quantity of fluid, the fluid quantity conveyed with the pump between the starting time and the end time and a filled volume of the pressure line section.

Furthermore, as already stated above, during the sub-steps B.3) and B.iii) there is, in each case, continuous pressure rise that is preferably monitored. However, this continuous pressure rise preferably does not start until the fluid reaches the pressure sensor. If sections of the conveying line located between the pressure sensor and the tank are filled up, no pressure increase occurs. The time at which the fluid reaches the pressure sensor can therefore be identified as the starting time of the pressure increase. The starting time can be detected, for example, from the fact that the pressure, which is measured (for the first time) at the pressure sensor, exceeds a threshold value. The starting time can also be detected from the fact that a pressure gradient, which exceeds a threshold value, occurs at the pressure sensor. The end time can simply be detected on the basis of sub-step B.4) or B.iv). On the basis of operating parameters of the pump it is possible to calculate which fluid quantity has been conveyed by the pump in the time period between the starting time and the end time. These operating parameters can comprise, for example, a drive speed of the pump (in particular a rotational speed or a pump drive frequency) and/or a conveying volume of the pump (in particular a swept volume of the pump) related to the drive speed. This (determined) fluid quantity is compared with a filled volume of the pressure line section. This filled volume is the volume in the conveying line between the pressure sensor and the injector (within the pressure line section).

A fault in the calculated fluid quantity can be detected on the basis of the difference between this filled volume and the calculated fluid quantity. The pump can be calibrated by subsequently correcting this fault by a correspondingly selected compensation factor in a control unit. It is particularly advantageous that this calibration can be carried out when the device is put into service, without, in the process, a loss of liquid additive occurring. This calibration can be used in the first embodiment variant and/or in the second embodiment variant of step B).

The described embodiment variants of step B) (the first embodiment variant with the sub-steps B.1) to B.5) and the second embodiment variant with the sub-steps B.i) to B.iv) can each be applied independently of the method steps A), C), D) and E) and can, if appropriate, also be implemented without the features of method steps A), C), D) and E).

Furthermore, the method is advantageous if step E) comprises at least the following sub-steps:
E.1) opening the at least one injector;
E.2) sucking back the fluid with operation of the at least one pump counter to the conveying direction;
E.3) monitoring the pressure in the conveying line using the at least one pressure sensor;
E.4) detecting a pressure that corresponds to the ambient pressure at the at least one pressure sensor;
E.5) closing the at least one injector and stopping the sucking back of the fluid with the at least one pump.

The specified method sub-steps E.1 to E.5) specify a particularly preferred approach, which can be carried out within the scope of step E) in order to (only) partially empty the conveying line. In step E.1), the injector is opened, so that air that replaces the fluid can be sucked into the conveying line through the injector. In step E.2) the fluid is sucked back, wherein at the same time air is sucked into the conveying line through the injector. During the sucking back in method step E.3), the pressure in the conveying line is monitored with the at least one pressure sensor. In step E.4) it is detected if a pressure corresponding to the ambient pressure is present at the pressure sensor. A connection exists, which is filled with air, from the injector to the pressure sensor, via which connection the ambient pressure continues from the surroundings (or from the exhaust gas treatment device to which the injector is connected) as far as the pressure sensor. Therefore, the ambient pressure can be measured at the pressure sensor.

The ambient pressure can be stored, for example, as a defined parameter in a control unit for carrying out the described method. The ambient pressure is typically 1 bar and corresponds to atmospheric pressure. In order to detect the ambient pressure particularly accurately and to be able to carry out the method step E) or the method step E.4) particularly precisely, it is also possible for the ambient pressure to be monitored actively. Then, correspondence with the ambient pressure in step E) or in step E.4) can be detected particularly precisely because fluctuations of the ambient temperature can also be taken into account.

In step E.5) the injector is closed and the sucking back of the fluid with the at least one pump is ended. The injector is closed so that no further air is sucked from the surroundings of the injector into the conveying line.

This method is also advantageous if, during the sub-step E.3), a sudden pressure drop occurs and subsequently a continuous pressure rise is monitored.

A sudden pressure drop means that the pressure drops abruptly to a great extent within a very short time. During the sudden pressure drop, the pressure has a very large negative gradient. The pressure drop is typically characterized by a change in the pressure from customary operating pressures of the device to a pressure below the atmospheric pressure.

This pressure drop occurs because the pressure built up in the pressure line section of the conveying line is no longer maintained by the pump but instead the pump conveys the fluid out of the pressure line section of the conveying line. The pressure typically drops to an underpressure below the atmospheric pressure. When the pressure drop has finished, a continuous pressure rise (increasing over a predefined time period) subsequently occurs again, as a result of which pressure rise the pressure measured at the pressure sensor slowly approaches the ambient pressure, until finally the ambient pressure is present at the pressure sensor.

The method is particularly advantageous if the at least one pump is operated during the sub-steps E.2) and E.3) for a time period of 5 seconds to 20 seconds. It has become apparent that a time interval of this order of magnitude is sufficient to partially empty a conveying line of a typical length (for example between 2 m [meters] and 5 m), without an increased conveying power of the pump being necessary for this.

The described embodiment variant of step E) with the sub-steps E.1) to E.5) can also be applied independently of steps A), B), C) and D) and can, if appropriate, also be claimed without the features of steps A), B), C) and D).

The described method also makes it possible, in particular, to empty the described device in principle only partially. As a result, the volume of fluid conveyed overall during the service life of the device can be reduced, with the result that the service life of the device is, in part, considerably reduced.

Furthermore, in another aspect, a motor vehicle is proposed having at least an internal combustion engine, an exhaust gas treatment device for purifying the exhaust gases of the internal combustion engine, and a device for conveying a fluid to the exhaust gas treatment device, wherein the device is configured to be operated according to a described method. The device can have all the device features described above in relation to the method. The fluid conveyed to the exhaust gas treatment device is preferably a liquid additive with which the SCR method can be carried out in the exhaust gas treatment device. This is, in particular, urea-water solution. In order to carry out the SCR method, an SCR catalytic convertor at which nitrogen oxide compounds in the exhaust gas of the internal combustion engine can be reduced using the liquid additive is provided in the exhaust gas treatment device.

BRIEF DESCRIPTION OF THE DRAWINGS

The invention and the technical environment are explained below in more detail with reference to the figures. It is noted that the figures present only schematic exemplary embodiments and, in particular, the size ratios illustrated in the figures are only schematic. The features specified individually in the figures can be combined in any desired technically appropriate way with the further features of the description and of the patent claims, wherein further exemplary embodiments of the invention are indicated. In the drawings:

DETAILED DESCRIPTION OF THE PRESENTLY PREFERRED EMBODIMENTS

Figure 1:
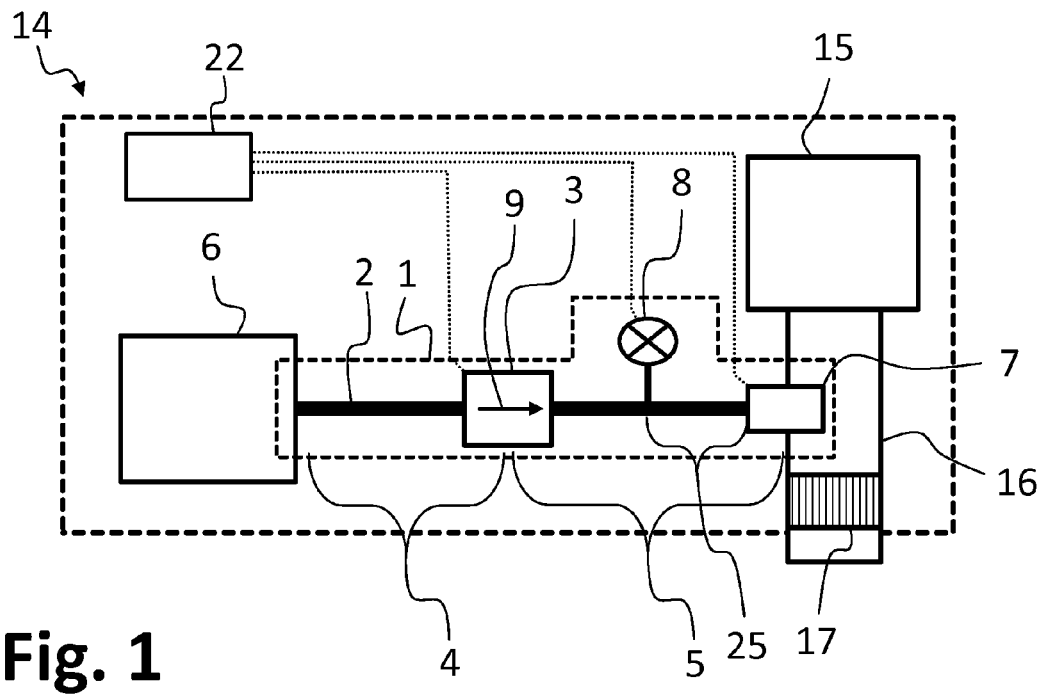
FIG. 1: shows a motor vehicle having a device which is operated according to a described method.

FIG. 1 shows a motor vehicle 14 having an internal combustion engine 15 and an exhaust gas treatment device 16 with an SCR catalytic convertor 17 for purifying the exhaust gases of the internal combustion engine 15. A fluid for purifying exhaust gas can be fed to the exhaust gas treatment device 16 using a described device 1. A device 1 conveys the fluid from a tank 6 to an injector 7. The conveying line 2 leads from the tank 6 to the injector 7 and is divided by a pump 3 into a suction line section 4 from the tank 6 to the pump 3, and into a pressure line section 5 from the pump 3 to the injector 7. The pump 3 conveys the fluid with a conveying direction 9 from the tank 6 to the injector 7. A pressure sensor 8, with which the pressure in the pressure line section 5 of the conveying line 2 can be monitored, is arranged at the pressure line section 5. A volume 25 of the conveying line 2 between the pressure sensor 8 and the injector 7, which can be used to calibrate the pump 3, is also marked in FIG. 1.

The motor vehicle 14 has a control unit 22 connected at least to the injector 7, the pressure sensor 8 and the pump 3. The described method is stored, for example in a non-transitory computer-readable medium, in the control unit 22 as an executable routine and can be carried out by the control unit 22 correspondingly controlling the respective components (in particular injector 7 and pump 3).

Figure 2:
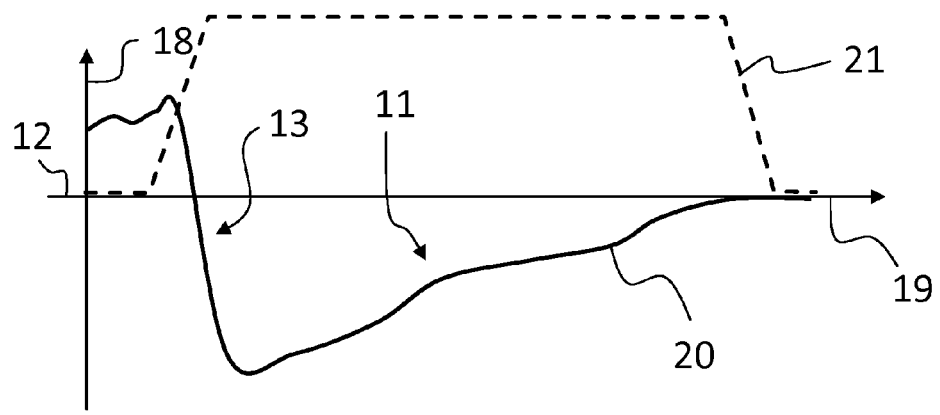
FIG. 2: shows a pressure curve which occurs in a device when the device is emptied.
Figure 3:
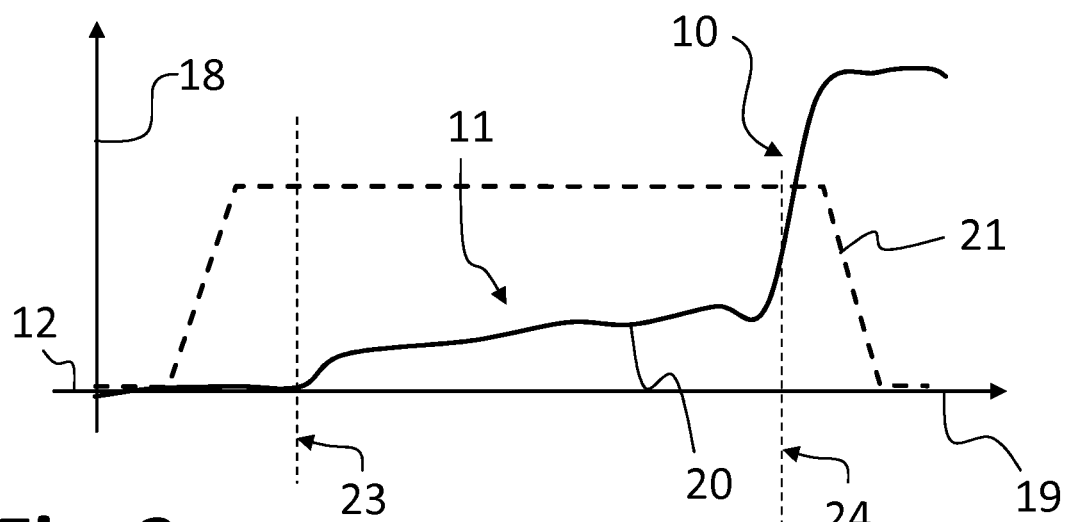
FIG. 3: shows a pressure curve which occurs in a device when the device is filled.

FIGS. 2 and 3 each show in a diagram a pressure curve 20 on the time axis 19 and a pump drive curve 21. The pressure is respectively plotted on the vertical pressure axis 18. The pump drive curve 21 is illustrated in the dashed form very schematically in the background of the diagram in each case. FIG. 2 illustrates the pressure curve measured at the pressure sensor when the device is emptied. As soon as the pump drive is started for the purpose of emptying (see rising edge of the pump drive curve 21 in FIG. 2), the pressure at the pressure sensor drops with a sudden pressure drop, wherein a pressure below the ambient pressure 12 is established. Subsequently, a continuous pressure rise 11 occurs, until the pressure reaches the ambient pressure 12 again. Then, the drive of the pump is stopped (see falling edge of the pump drive curve 21 in FIG. 2).

FIG. 3 illustrates the pressure curve 20 that occurs during a filling process of a device from FIG. 1 (step B of the described method). A pump drive curve 21 is also illustrated by dashed lines in the background in FIG. 3. The pump drive is firstly started (see rising edge of the pump drive curve 21 in FIG. 3). Starting from then, a continuous pressure rise occurs in the conveying line. As soon as the fluid reaches the injector, a sudden pressure increase 10 occurs. Then, the pump drive is stopped (see falling edge of the pump drive curve 21 in FIG. 3). FIG. 3 also shows a starting time 23 at which the continuous pressure rise 11 starts, because the fluid has reached the pressure sensor. An end time 24 at which the filling is finished and the sudden pressure increase 10 occurs is also marked.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a device that conveys a fluid, the device having a conveying line dividable into a suction line section, from at least one tank to at least one pump, and into a pressure line section, from the pump to at least one injector, the device having at least one pressure sensor arranged on the pressure line section, the method comprising:
   A) detecting activation of the device;
   B) filling the conveying line with the fluid by operating the at least one pump in a conveying direction from the at least one tank to the at least one injector to cause a change in pressure beginning at a starting time when the fluid reaches the at least one pressure sensor, and detecting complete filling of the conveying line based on at least one sudden pressure increase at the at least one pressure sensor at an end time;
   C) operating the pump and making available fluid at the injector;
   D) detecting deactivation of the device;
   E) partially emptying the conveying line by sucking back the fluid by operation of the at least one pump in a direction counter to the conveying direction, wherein the emptying is stopped if pressure measured at the at least one pressure sensor corresponds to an ambient pressure; and
   F) calibrating the pump by comparison of the quantity of fluid conveyed with the pump between the starting time and the end time and a filled volume of the pressure line section.

2. The method as claimed in claim 1, wherein during step C) a constant pressure is maintained in the pressure line section of the conveying line using the at least one pump, and metered provision of fluid is achieved by an adapted opening time of the at least one injector.

3. The method as claimed in claim 1, wherein step B) comprises at least the following sub-steps:
   B.1) opening the at least one injector;
   B.2) conveying fluid with the at least one pump;
   B.3) monitoring the pressure in the conveying line using the at least one pressure sensor;
   B.4) detecting the sudden pressure increase at the at least one pressure sensor; and
   B.5) closing the at least one injector and stopping the conveying of fluid with the at least one pump.

4. The method as claimed in claim 3, wherein during sub-step B.3) a continuous pressure rise is monitored, which pressure rise occurs as a result of the filling of the conveying line.

5. The method as claimed in claim 3, wherein the at least one pump is operated for a period of 5 seconds to 20 seconds during the sub-step B.2).

6. The method as claimed in claim 1, wherein step B) comprises at least the following sub-steps:
   B.i) closing the at least one injector;
   B.ii) conveying fluid with the at least one pump;
   B.iii) monitoring the pressure in the conveying line using the at least one pressure sensor; and
   B.iv) detecting the sudden pressure increase at the at least one pressure sensor.

7. The method as claimed in claim 6, wherein during sub-step B.iii) a continuous pressure rise is monitored, which pressure rise occurs as a result of the filling of the conveying line.

8. The method as claimed in claim 6, wherein the at least one pump is operated for a period of 5 seconds to 20 seconds during the sub-step B.ii).

9. The method as claimed in claim 1, wherein step E) comprises at least the following sub-steps:
E.1) opening the at least one injector;
E.2) sucking back the fluid with operation of the at least one pump in a direction counter to the conveying direction;
E.3) monitoring the pressure in the conveying line using the at least one pressure sensor;
E.4) detecting a pressure that corresponds to the ambient pressure at the at least one pressure sensor;
E.5) closing the at least one injector and stopping the sucking back of the fluid with the at least one pump.

10. The method as claimed in claim 9, wherein a sudden pressure drop occurs during sub-step E.3), and subsequently a continuous pressure rise is monitored.

11. The method as claimed in claim 9, wherein the at least one pump is operated for between 5 seconds and 20 seconds during the sub-steps E.2) and E.3).

12. A motor vehicle comprising an internal combustion engine, an exhaust gas treatment device configured to purify the exhaust gases of the internal combustion engine, a device configured to convey a fluid to the exhaust gas treatment device, and a control unit configured to control the device configured to convey a fluid to the exhaust gas treatment device according to the method as claimed in claim 1.

13. A method for operating a device that conveys a fluid, the device having a conveying line dividable into a suction line section, from at least one tank to at least one pump, and into a pressure line section, from the pump to at least one injector, the device having at least one pressure sensor arranged on the pressure line section, the method comprising:
A) detecting activation of the device;
B) filling the conveying line with the fluid by operating the at least one pump in a conveying direction from the at least one tank to the at least one injector, and detecting complete filling of the conveying line based on at least one sudden pressure increase at the at least one pressure sensor;
C) operating the pump and making available fluid at the injector;
D) detecting deactivation of the device; and
E) partially emptying the conveying line by sucking back the fluid by operation of the at least one pump in a direction counter to the conveying direction, wherein the emptying is stopped if pressure measured at the at least one pressure sensor corresponds to an ambient pressure,
wherein step B) comprises at least the following sub-steps:
B.1) opening the at least one injector;
B.2) conveying fluid with the at least one pump;
B.3) monitoring the pressure in the conveying line using the at least one pressure sensor;
B.4) detecting the sudden pressure increase at the at least one pressure sensor; and
B.5) closing the at least one injector and stopping the conveying of fluid with the at least one pump,
wherein a starting time is detected at which a change in the pressure begins during sub-step B.3) at the pressure sensor, and an end time is detected at which the sudden pressure increase occurs in sub-step B.4), wherein the pump is calibrated by comparison of the quantity of fluid conveyed with the pump between the starting time and the end time and a filled volume of the pressure line section.

14. A method for operating a device that conveys a fluid, the device having a conveying line dividable into a suction line section, from at least one tank to at least one pump, and into a pressure line section, from the pump to at least one injector, the device having at least one pressure sensor arranged on the pressure line section, the method comprising:
A) detecting activation of the device;
B) filling the conveying line with the fluid by operating the at least one pump in a conveying direction from the at least one tank to the at least one injector, and detecting complete filling of the conveying line based on at least one sudden pressure increase at the at least one pressure sensor;
C) operating the pump and making available fluid at the injector;
D) detecting deactivation of the device; and
E) partially emptying the conveying line by sucking back the fluid by operation of the at least one pump in a direction counter to the conveying direction, wherein the emptying is stopped if pressure measured at the at least one pressure sensor corresponds to an ambient pressure,
wherein step B) comprises at least the following sub-steps:
B.i) closing the at least one injector;
B.ii) conveying fluid with the at least one pump;
B.iii) monitoring the pressure in the conveying line using the at least one pressure sensor; and
B.iv) detecting the sudden pressure increase at the at least one pressure sensor,
wherein a starting time is detected at which a change in the pressure begins during sub-step B.iii) at the pressure sensor, and an end time is detected at which the sudden pressure increase occurs in sub-step B.iv), wherein the pump is calibrated by comparison of the quantity of fluid conveyed with the pump between the starting time and the end time and a filled volume of the pressure line section.

* * * * *